United States Patent [19]

Demaine et al.

[11] 4,015,235
[45] Mar. 29, 1977

[54] AIRCRAFT PARKING GUIDANCE INDICATOR

[75] Inventors: David George Anthony Demaine, Leeds; John David Archer, Halifax; Richard Lawrence Fisher, Leeds, all of England

[73] Assignee: The Rank Organisation Limited, London, England

[22] Filed: June 6, 1975

[21] Appl. No.: 584,528

[30] Foreign Application Priority Data

June 5, 1974 United Kingdom ............ 24884/74

[52] U.S. Cl. .................................. 340/26; 340/51
[51] Int. Cl.[2] ........................................ G08G 5/00
[58] Field of Search .................... 340/25, 51, 26

[56] References Cited

UNITED STATES PATENTS

| | | | |
|---|---|---|---|
| 2,475,256 | 7/1949 | Saint | 340/25 |
| 2,559,415 | 7/1951 | Field | 340/25 |
| 2,913,702 | 11/1959 | Ferguson | 340/25 |
| 3,639,899 | 2/1972 | Ljungkull | 340/25 |
| 3,662,332 | 5/1972 | Zechnowitz | 340/51 |
| 3,704,070 | 11/1972 | Johnson | 340/25 |
| 3,729,262 | 4/1973 | Snead | 340/26 |
| 3,767,309 | 10/1973 | Brown | 340/26 |
| 3,821,697 | 6/1974 | Brown | 340/25 |
| 3,873,210 | 3/1975 | Konopka | 340/26 |

Primary Examiner—Thomas B. Habecker
Attorney, Agent, or Firm—Brisebois & Kruger

[57] ABSTRACT

An optical system for guiding the pilot of a ground-maneuvering aircraft towards a parking bay has, an illuminated target positioned behind a fixed stop aperture along a line of sight of the pilot which is inclined to the direction of approach of the aircraft to the bay. As the aircraft advances different areas of the target come successively into sight by parallax, and these may be differently colored to indicate the correct stopping position and also whether the aircraft is to the left or right of the correct approach line.

10 Claims, 7 Drawing Figures

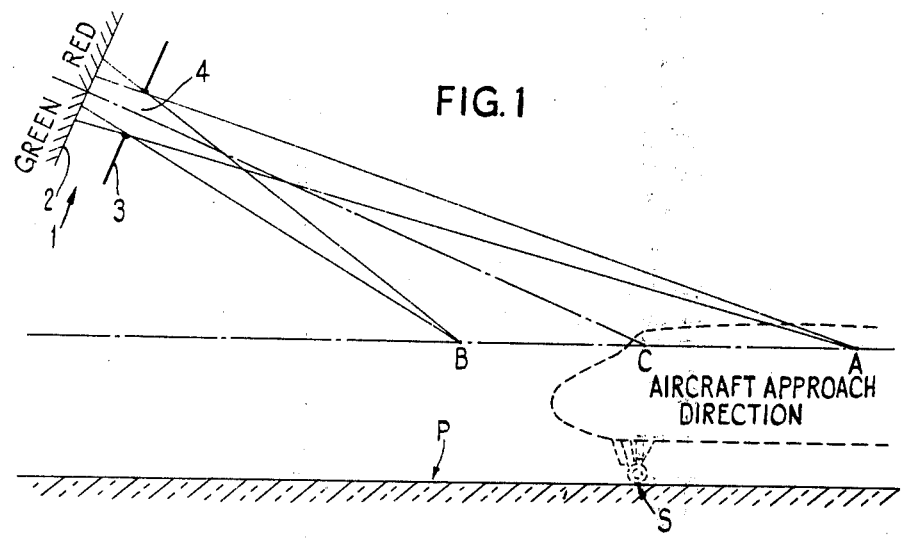
FIG. 1
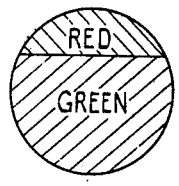
A APPROACHING CORRECT POSITION
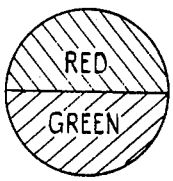
C AT CORRECT POSITION
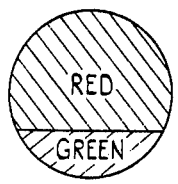
B PAST CORRECT POSITION
FIG. 2

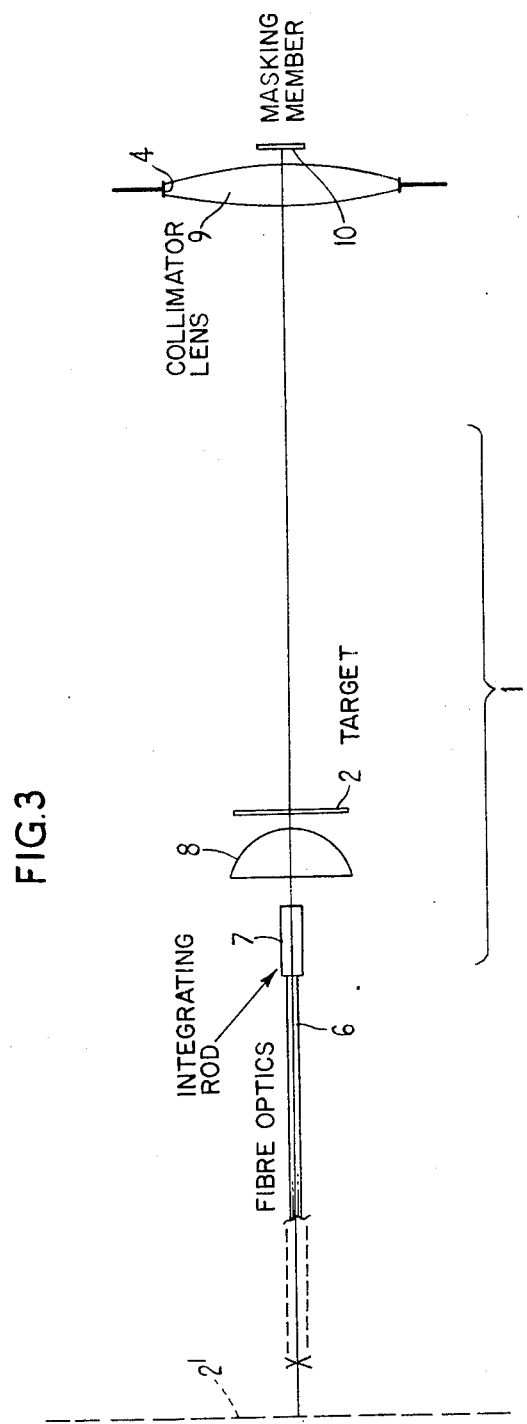

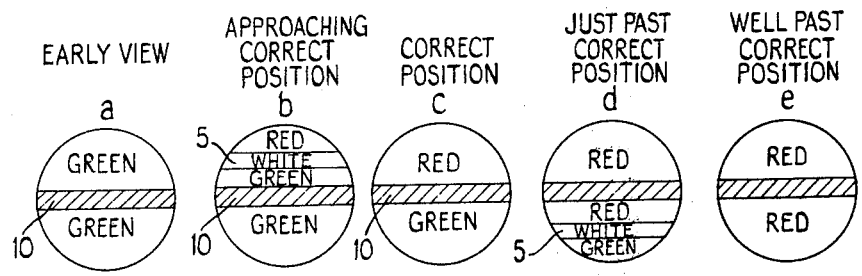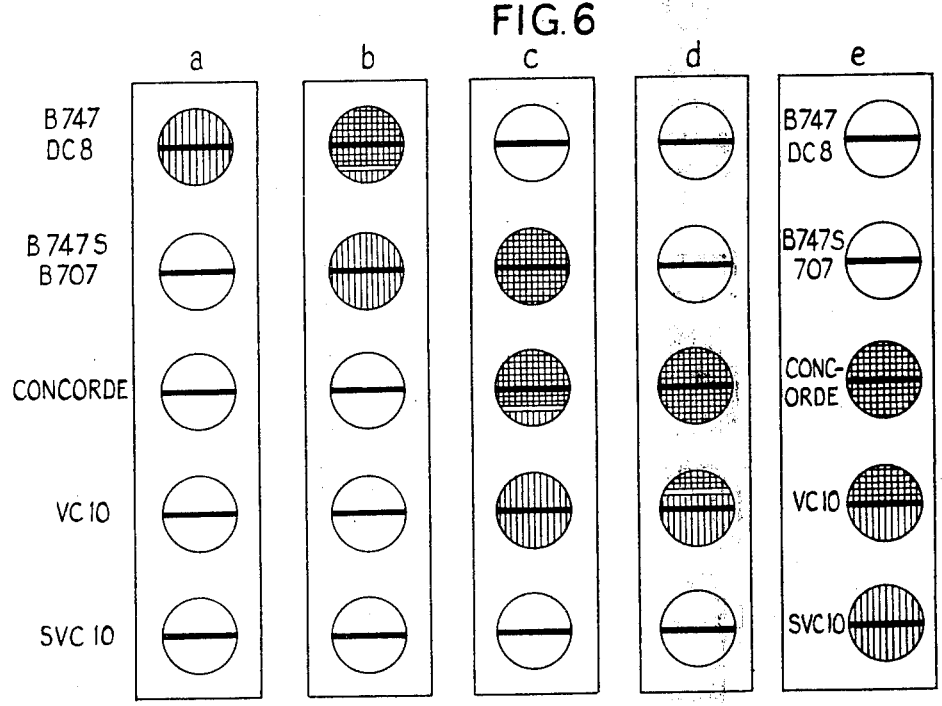

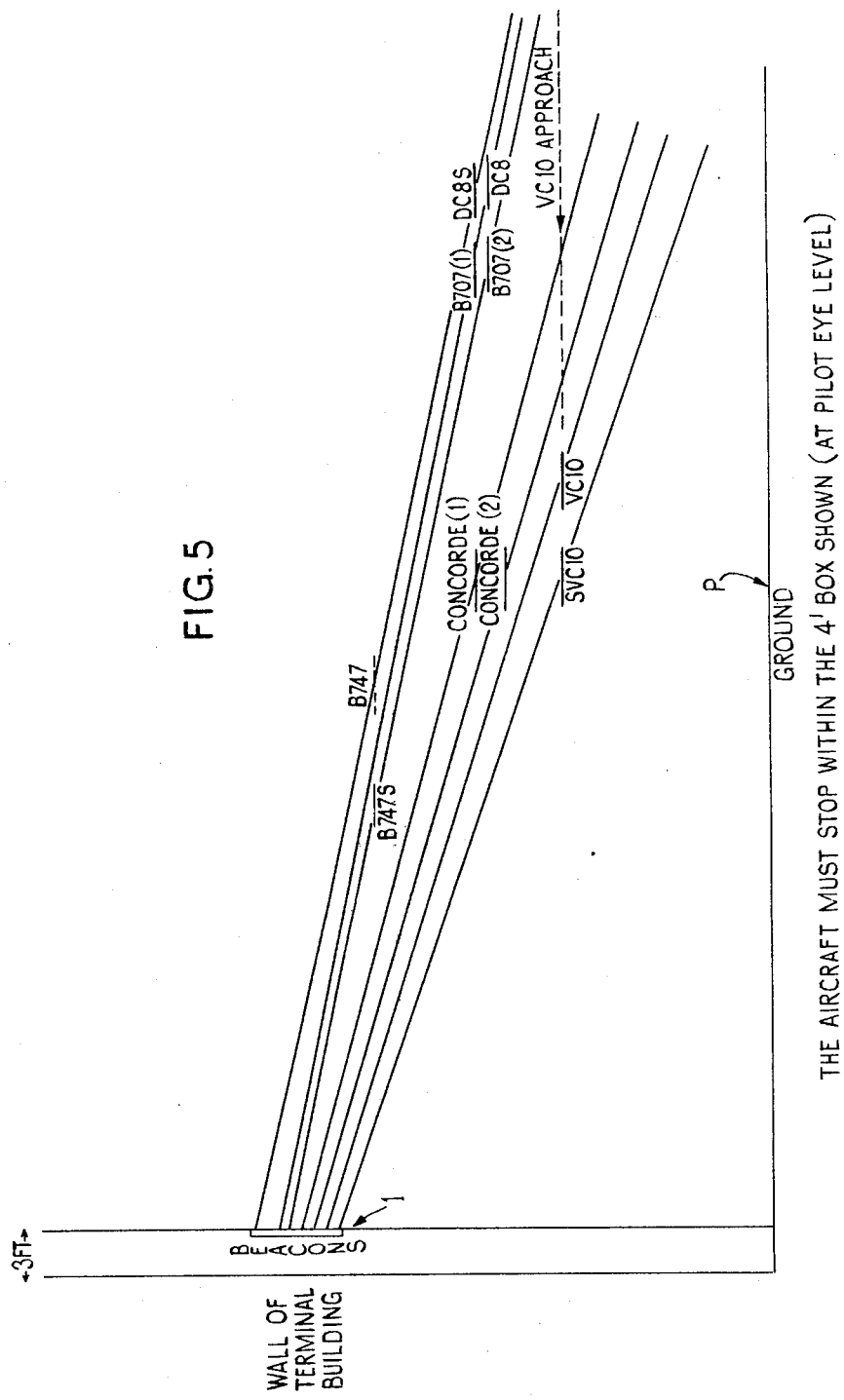

AIRCRAFT PARKING GUIDANCE INDICATOR

This invention relates to a system for guiding the pilot of an aircraft maneuvering on the ground.

In modern airports equipped with special terminal facilities it is important that aircraft should be maneuvred under pilot control to precisely defined parking positions relative to service facilities, such as passenger embarkation gangways, refuelling points, and other ground services. Where aircraft of different types are intended to use a given parking bay the aircraft will in general have different stopping positions in the bay. To assist the pilot in parking an aircraft in the bay it has been known to provide suitable markings indicating to the pilot the stopping point for aircraft of different types: in general, however, such markings are unsatisfactory since they are critically dependent upon the quality of the pilot's eyesight, and upon the prevailing atmospheric visibility. It is not possible with remote external visual markings to ensure that an aircraft stops in a parking bay within two feet of the correct position, which is the order of accuracy required for the parking of aircraft in modern terminal facilities.

An optical guidance system has been proposed for assisting the ground-maneuvering of an aircraft by a pilot into a correct parking position. In this system an illuminated marker is observed by the pilot of an approaching aircraft and the position of the marker on an illuminated screen provides the pilot with an indication of his position relative to a correct parking position for that aircraft; the pilot maneuvres the aircraft until the illuminated marker is coincident with the appropriate fixed marker, when the aircraft will be in the correct parking position.

A disadvantage of this previously known optical ground-guidance system is that it has insufficient precision and does not allow for the consistent parking of an aircraft at a specified parking or docking position, at least within the tolerance (±2 feet) allowed due to variations of loading of individual aircraft. Since the system relies upon the pilot being able to align two markers the system is, moreover, critically dependent upon the pilot's eyesight, and upon atmospheric visibility conditions.

An object of the present invention is to provide an improved system for the guidance of ground-maneuvering aircraft.

According to the invention there is provided a system for guiding the pilot of an aircraft manoeuvering on the ground towards a parking bay or other fixed ground position, comprising an illuminated target which is positioned behind a fixed stop aperture at a predetermined position relative to the fixed ground position such that the target is viewable through the stop aperture by the pilot of an approaching aircraft, along a line of sight which is inclined to the direction of approach of the aircraft, so that as the aircraft advances different portions of the target come successively into the pilot's view, the target and its position being specific to one particular aircraft type and having differently colored or otherwise distinguishable zones the relative areas of which as viewed through the stop aperture indicate to the pilot of an aircraft of that type the aircraft's position relative to the fixed ground position.

Since the target which is viewed by the pilot of an aircraft is specific to one type of aircraft the display given by the system is unambiguous, and moreover the relative sizes of the differently colored or otherwise distinguishable areas of the illuminated target can be arranged for easy and accurate observation by the pilot, virtually independently of atmospheric visibility or the quality of the pilot's eyesight. For example, the system would normally be arranged so that the target has two differently colored zones the areas of which become equal when the aircraft is in the correct position. This condition is in general easier to observe with precision than an alignment of a marker with one of a number of different fixed markers, particularly in poor visibility.

In a preferred practical embodiment of the invention the stop aperture includes at least one fixed reference mark which the pilot sees superimposed on the target as the aircraft approaches the fixed ground position, the region of the target which the reference mark obscures when viewed by the pilot changing progressively as the aircraft approaches the fixed ground position. For example, the reference mark may comprise a fixed horizontal masking member extending centrally across a stop aperture, and the region of the target which is obscured by the reference mark when the aircraft is in the correct ground position may itself be prominent and distinguishable from the remainder of the target. For example, the target may have a horizontal white stripe separating differently colored zones of the target, and the horizontal masking member may obscure this white stripe when the aircraft is correctly positioned, giving a precise and unambiguous visual indication to the pilot.

To improve the parallax between the stop and the target the stop aperture is preferably defined by a lens assembly through which light from the illuminated target passes to produce in the line of sight of the pilot a virtual image of the target spaced further behind the stop aperture than the target itself. The lens assembly may conveniently consist of a single converging lens.

The target preferably comprises a flat graticule of transparent or translucent material illuminated from behind. The rear illumination of the graticule is preferably effected by a light source which illuminates the target graticule through a fibre-optical light guide. The fibre-optical light guide may illuminate the target graticule through an integrating rod and a condenser lens in a preferred practical embodiment of the invention.

In a preferred embodiment of the invention, as mentioned above, the target has upper and lower differently colored or otherwise distinguishable areas separated by a horizontal boundary so that when the aircraft advances over the ground along a correct approach line including the fixed ground position the pilot sees one or the other area predominantly according to whether the aircraft is short of, or has overshot, the fixed position. This arrangement is adapted for indicating the correct stopping position of an aircraft on a given line of approach to, for example, a parking bay.

The invention is, however, also applicable to the guidance of an aircraft laterally with respect to a given correct line of approach. For this purpose the target in the system according to the invention would have at least one region which is divided into two differently colored or otherwise distinguishable areas separated by a vertical boundary, the target as viewed by the pilot of an approaching aircraft comprising predominantly one or the other area according to whether the aircraft is on one side or the other of a correct approach line, both areas being equal and symmetrically disposed when the aircraft is on the correct approach line. Thus one of the said areas may conveniently be red and the other green, the red area being premominant in the target as seen by the pilot when the aircraft is to the left of the correct approach line and the green area being predominant when the aircraft is to the right of the correct approach line.

In a practical system in accordance with the invention it can be arranged that the illuminated target provides a simultaneous indication of both the lateral position of an aircraft relative to a correct approach line, and the stopping position of the aircraft on that approach line.

Where the system is employed in an aircraft parking areas such as a terminal facility designed for use by a number of aircraft of different types, the system would include a number of different assemblies of targets and associated stops each specific to a particular aircraft type and identified as such by suitable marking, the different targets being positioned to guide the pilots of different respective aircraft types to different respective fixed ground positions.

The invention will now be described, merely by way of example, with reference to the accompanying purely diagrammatic drawings, in which:

FIG. 1 illustrates the principle of operation of a simple embodiment of the present invention;

FIG. 2 represents three successive displays as seen by the pilot of an approaching aircraft at positions designated A, B and C in FIG. 1;

FIG. 3 is a typical practical embodiment of one of the beacons used in a system according to the invention;

FIG. 4 represents diagrammatically the displays observed by a pilot at different positions as indicated on an approach path to a parking or docking position;

FIG. 5 is a diagrammatic side elevation of a parking bay equipped with beacons forming part of a system according to the invention for the docking guidance of different types of aircraft, as indicated;

Figure 7:
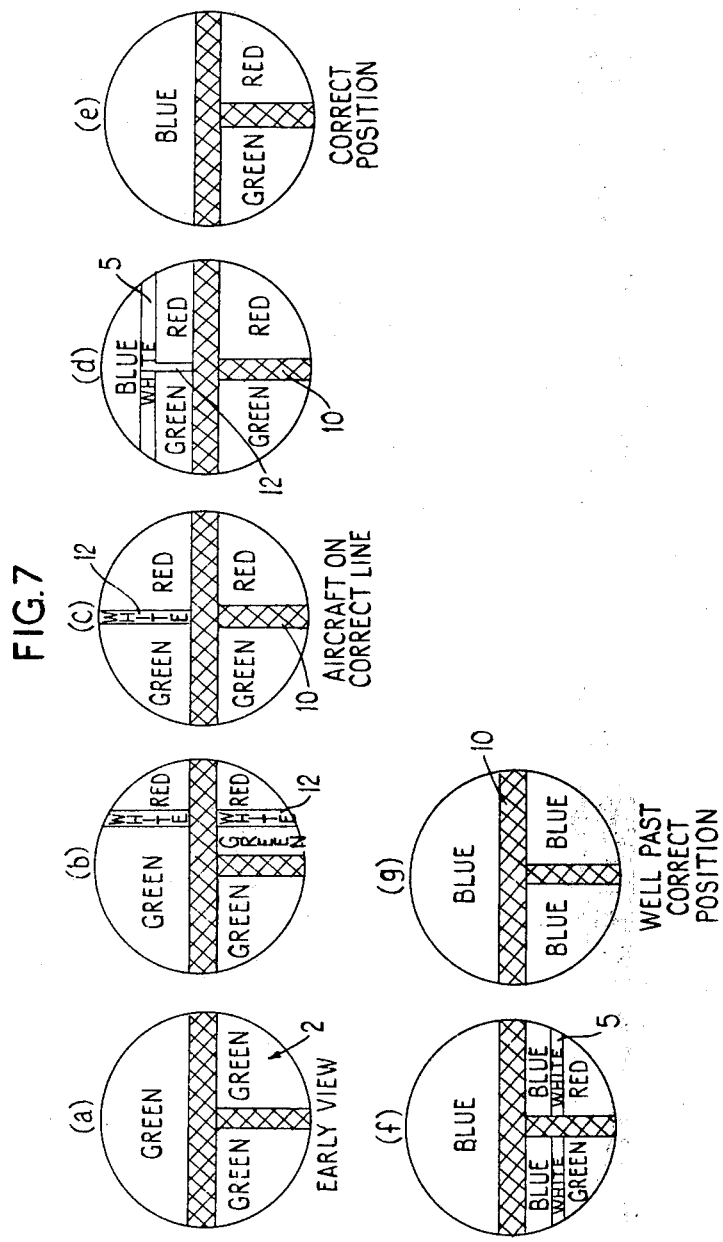

FIG. 6 represents diagrammatically the successive views of the display seen by the pilot of an aircraft of a given type (VC 10) on its approach to a correct parking position in the bay illustrated in FIG. 5; and FIG. 7 illustrates the successive views seen by the pilot of an aircraft using a system according to a further embodiment of the invention for providing an indication of the correct approach path and stopping position of an aircraft in a parking or docking facility.

Referring first to FIGS. 1 and 2, the principle of operation of the system according to the invention is an application of the familiar phenomenon of optical parallax. The solid line P represents the horizontal ground surface of a parking bay in which an aircraft of a given type is to be parked or docked at a specific stopping position S.

The system according to the present invention provides an illuminated beacon 1 which is mounted in a fixed position above the ground level, for example on a wall of the parking bay. The beacon 1 includes a flat target 2 which is inclined to the vertical and which faces downwardly towards the direction of approach of aircraft into the parking bay. A stop 3 is located in front of and parallel to the target 2 and has a circular aperture 4 through which the underlying target 2 is visible.

The level of the eyes of a pilot of an aircraft approaching the parking bay is indicated by the chain-dotted line AB. If the pilot observes the beacon 1 as the aircraft enters the parking bay the parallax between the stop 3 and the underlying target 2 will cause different areas of the target 2 to be visible at different positions on the approach, as illustrated in FIG. 1. The target 2 is subdivided by a horizontal line into equal zones of different color, an upper red zone and a lower green zone. Consequently the pilot will observe a progressive change in the relative areas of the red and green zones visible through the aperture 4 as the aircraft enters the parking bay. In the example illustrated, when the aircraft is short of the correct stopping distance, with the pilot at A, the portion of the target seen by the pilot is predominantly green, while the portion of the target 2 seen by the pilot at B when the aircraft has overshot the correct stopping position S is predominantly red. At the correct stopping position S of the aircraft the display seen by the pilot at C consists of equal red and green areas. The pilot therefore has an unambiguous indication of his correct stopping position in the parking bay. The successive displays seen by the pilot at points A, C and B are illustrated in FIG. 2.

It is desirable that the correct stopping position of the aircraft should be signalled to the pilot with sufficient accuracy to enable the aircraft to be stopped consistently within 2 feet of a predetermined fixed position in the parking bay, in order to ensure correct positioning of the aircraft relative to service facilities such as passenger embarkation ramps. A tolerance of ±2 feet is allowed to take into account variations in the height of the pilot's eye level AB relative to the ground, for example upon variation of the loading of an aircraft of a given type.

To provide for such precision in the docking of an aircraft the beacon 1 illustrated in FIG. 1 in a rudimentary form preferably has an optical arrangement as illustrated in FIG. 3. In FIG. 3 the target 2 consists of a transparent graticule having equal upper and lower areas of different colour (red and green respectively) separated by a horizontal white stripe 5 (FIG. 4). The target graticule 2 is illuminated from behind by light directed onto the graticule from a remote light source (not shown) through a fibre-optical light guide 6, an integrating rod 7, and a condenser lens 8. The illuminated target graticule 2 is observed through the stop aperture 4 which in this embodiment is provided by a biconvex collimator lens 9 which is positioned relative to the graticule 2 such that a distant observer, for example the pilot of an aircraft approaching a parking bay, sees a virtual image of the graticule 2 positioned in a plane 2' spaced further from the lens aperture 4 than the graticule 2 itself, thereby increasing the observable parallax between the stop aperture 4 and the target as seen by the aircraft pilot.

Positioned directly in front of the collimator lens 9, and extending horizontally and diametrically across the stop aperture 4, is a horizontal masking member 10 which is positioned so that when the aircraft is at the correct stopping position in the parking bay it masks completely the white strip 5 separating the green and red zones of the target graticule 2. By virtue of the magnification afforded by the lens 9 the sensitivity of the system can be made infinitely variable, the moment of masking of the stripe 5 by the masking member 10 as seen by the pilot at the correct stopping position can be as accurately defined as is required.

The successive displays seen by the pilot of an approaching aircraft viewing a beacon of the kind illustrated in FIG. 3 are illustrated diagrammatically in FIG. 4. The distribution of the colored zones of the observed image of the target graticule 2 relative to the horizontal masking member 10 indicate to the pilot whether he is approaching the correct position or has passed it, while the masking of the white stripe 5 by the member 10 provides a critical indication to the pilot of the accurate stopping position (3c).

When an aircraft parking or docking facility is intended for use by a number of different types of aircraft the system according to the invention may be suitably adapted by providing a beacon assembly incorporating a number of beacons as previously described, each beacon being specific to an aircraft of a given type. In the arrangement illustrated diagrammatically in FIG. 5 the beacons appropriate to aircraft of different types are arranged in a vertical array. The correct stopping positions of different types of aircraft are illustrated diagrammatically in FIG. 5 by short horizontal lines, each of which represents 4 feet, being the allowable tolerance in the positions of the pilot's eyes when the aircraft is correctly docked, the respective lines of sight between the pilot's eyes when the aircraft is correctly docked and the respective beacons are indicated in FIG. 5.

FIG. 6 illustrates the successive displays observed by a pilot of a given aircraft, in this example a VC 10, approaching the correct parking position (FIG. 5) with all the beacons of the vertical array illuminated. The optics of each beacon are arranged so that the illuminated target graticule is visible only within a given angle of view relative to the axis of the optical system, so that when the pilot is well outside the correct position the target in question is not illuminated, as indicated by the color key in FIG. 6. The individual displays appropriate to given aircraft types are marked clearly on the array of beacons, and the fact that different beacons are juxtaposed to each other provides the pilot of a given aircraft with a convenient warning of his approach to the correct parking position. Thus as illustrated in FIG. 6 the pilot of the approaching V.C.10 first sees an illuminated display appropriate to the D.C.8, then the B.707, and subsequently the Concorde, before the V.C.10 target display appears in the correct form indicating the stopping position (FIG. 6 (E)).

The present invention is readily adaptable to the guidance of aircraft laterally relative to a given correct approach path. For this purpose the illuminated target is further subdivided symmetrically into two halves of different color separated by a vertical line. In the embodiment illustrated in FIG. 7 the lower half of the target 2 is subdivided into two equal areas colored respectively green and red, separated by a vertical white stripe 12 which intersects the horizontal white stripe 5 forming a T. Above the horizontal white stripe 5 the target is coloured blue, so that the target has three readily distinguishable colored zones separated by white stripes. In this embodiment the masking member 10 has the shape of a T, with a vertical bar which, in the correct lateral position of the aircraft on the correct approach line to the parking position masks the vertical white stripe 12. If the aircraft is to the right of the correct approach line the lower part of the observed display is predominantly green (FIG. 7b) while if the aircraft is to the left of the correct approach line the lower part of the observed display is predominately red. When the aircraft is correctly docked the T-shaped masking member completely obscures the white stripes 5 and 12, as illustrated in FIG. 7e.

In a multi-beacon installation of the kind illustrated in FIG. 5 for the docking guidance of a number of different aircraft types, it may be found preferable in practice to provide individual beacons of the kind illustrated in FIGS. 3 and 4, and a separate beacon indicating the correct approach line, with a vertically subdivided target, since this approach line would in practice be the same for aircraft or all types.

It will be appreciated that the invention can alternatively be embodied with beacons which, instead of being positioned above the eye level of aircraft pilots is positioned below eye level, and/or to one side of the approach line of the aircraft, provided that a change in parallax between an aperture stop and an observed target is seen as the pilot approaches the correct parking position.

In a typical practical embodiment of the invention the optics of each beacon would provide an observable beam with a spread of about 7°, and where more than one beacon is provided it would be arranged that at any one time at least one illuminated beacon is within the pilot's view. Typically each illuminated beacon would come into view about 10 feet before the correct stopping position is reached. Where there is additional provision for lateral guidance relative to a correct approach line it may be convenient to arrange a greater angle of spread of the beam provided by the beacon indicating lateral position so that the lateral alignment beacon is visible by the pilot over a greater distance from the correct line of approach.

We claim:
1. An optical system for guiding the pilot of a ground-maneuvering aircraft along an approach line to a predetermined ground position such as a parking bay, comprising:

means defining a stop aperture, at least one fixed reference element located in the stop aperture, the reference element obscuring an area of the target as viewed through the stop aperture, said obscured area changing progressively according to the viewing position along said approach line, a target positioned behind and spaced from the stop aperture, the target and the stop aperture being coaxial and located at a predetermined fixed position above said ground position, the line passing through the center of the target and the center of the stop aperture being inclined downwardly towards the direction of approach of aircraft along said approach line, illumination means for illuminating the target, and means subdividing the target into upper and lower zones of different color visible through the stop aperture, the size of the target as viewed by the pilot of an approaching aircraft through the stop aperture, being larger than the size of the stop aperture, whereby the relative areas of the two colored zones as viewed through the stop aperture vary according to the viewing position along said approach line, indicating to the pilot the position of the aircraft along the said approach line relative to said predetermined ground position.

2. The system defined in claim 1, wherein the target further has a region which is sub-divided symmetrically into two differently colored areas separated by a vertical boundary, the said target region as viewed through the stop aperture comprising predominantly one of said areas or other according to whether viewing position is on one side or the other of the approach line.

3. The system defined in claim 2, wherein one of said areas is red and the other green, the red area being predominant in the target region as seen from viewing positions to the left of the approach line and the green area being predominant in the target region as seen from viewing positions to the right of the approach line.

4. The system defined in claim 1 comprising a number of different target and fixed stop assemblies, identification means identifying each target and stop assembly with a different aircraft type and identified as such, the different targets being positioned to guide the pilots of said different respective aircraft types along said approach line to different respective predetermined ground positions.

5. The system defined in claim 1 wherein the reference element comprises a fixed horizontal masking member extending centrally across the stop aperture.

6. The system defined in claim 1 wherein the stop aperture defining means comprise a lens assembly through which light from the illuminated target passes to produce a virtual image of the target spaced further behind the stop aperture than the target itself; for viewing positions located along the approach line.

7. The system defined in claim 6, wherein the lens assembly comprises a single converging lens.

8. The system defined in claim 4 wherein the target comprises a flat graticule of light transmitting material, said illumination means illuminating said graticule from behind.

9. The system defined in claim 8, wherein said illumination means comprise a light source and a fibre-optical light guide extending from the light source towards the graticule.

10. The system defined in claim 9, including the optical light guide illuminates the target graticule through light integrating means and a condenser lens interposed between the target graticule and the fibre-optical light guide.

* * * * *